United States Patent
McGarvey

(10) Patent No.: US 7,287,156 B2
(45) Date of Patent: Oct. 23, 2007

(54) METHODS, SYSTEMS AND COMPUTER PROGRAM PRODUCTS FOR AUTHENTICATION BETWEEN CLIENTS AND SERVERS USING DIFFERING AUTHENTICATION PROTOCOLS

(75) Inventor: John R. McGarvey, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 1126 days.

(21) Appl. No.: 09/896,851

(22) Filed: Jun. 29, 2001

(65) Prior Publication Data

US 2003/0005286 A1  Jan. 2, 2003

(51) Int. Cl.
*H04L 9/32* (2006.01)

(52) U.S. Cl. .............. 713/153; 713/155; 713/181; 726/10

(58) Field of Classification Search ............ 713/155, 713/156, 157, 160, 169, 176, 181, 153; 726/10, 726/14; 709/226
See application file for complete search history.

(56) References Cited

U.S. PATENT DOCUMENTS

| | | | |
|---|---|---|---|
| 5,511,122 A | 4/1996 | Atkinson | 380/25 |
| 5,535,276 A * | 7/1996 | Ganesan | 713/155 |
| 5,708,714 A | 1/1998 | Lopez et al. | 380/25 |
| 5,724,425 A | 3/1998 | Chang et al. | 380/25 |
| 5,737,419 A * | 4/1998 | Ganesan | 713/169 |
| 5,923,756 A | 7/1999 | Shambroom | 380/21 |
| 6,003,136 A | 12/1999 | Schanze | 713/201 |
| 6,009,175 A | 12/1999 | Schanze | 380/23 |
| 6,055,639 A | 4/2000 | Schanze | 713/201 |
| 6,158,007 A | 12/2000 | Moreh et al. | 713/201 |
| 6,175,920 B1 | 1/2001 | Schanze | 713/150 |
| 6,643,774 B1 * | 11/2003 | McGarvey | 713/155 |

OTHER PUBLICATIONS

"Kerberos: An Authentication Service for Computer Networks." *IEEE Communications Magazine*, vol. 32, No. 9, Sep. 1994, pp. 33-38.

* cited by examiner

*Primary Examiner*—Justin Darrow
(74) *Attorney, Agent, or Firm*—Stevens & Showalter

(57) ABSTRACT

Methods, systems and computer program products are provided for authenticating a message from a client using a first authentication protocol and a resource manager using a second authentication protocol different from the first authentication protocol by generating a second message from the message from the client. The second message may include information from the client which has been authenticated using the first authentication protocol. The second message is authenticated using the second authentication protocol and the authenticated second message is provided to the resource manager.

24 Claims, 7 Drawing Sheets

METHODS, SYSTEMS AND COMPUTER PROGRAM PRODUCTS FOR AUTHENTICATION BETWEEN CLIENTS AND SERVERS USING DIFFERING AUTHENTICATION PROTOCOLS

FIELD OF THE INVENTION

The present invention relates to authentication and more particularly to authentication of messages where a principal and a resource utilize different security protocols.

BACKGROUND OF THE INVENTION

Networked computer applications are often deployed using a "tiered" model. In this model, the originator of a request for a unit of work (also referred to as a "principal") typically initiates that work via a client program (first tier), which then communicates to a web server, or similar second tier server (also referred to as a middle-tier server), which itself communicates, on behalf of the request originator, to other middle-tier servers and/or to third or fourth tier servers such as database servers or other resource managers. When the request is processed by the resource managers, they, typically, evaluate whether the request originator has been authenticated and whether the originator is authorized to perform the unit of work. The resource managers, typically, also record access by the originator of the request in appropriate audit logs.

Such a tiered approach to networked applications may create a need for the secure propagation of security credentials of the request originator through each of the tiers of the application. In such propagation of secure credentials, the request originator delegates to the middle-tier servers the authority to access other servers on their behalf. Thus, the secure propagation of the credentials of the request originator (the requesting "principal") may be referred to as "delegation" or "impersonation."

One security mechanism that provides for delegation is Kerberos. In Kerberos, the requesting principal sends the request accompanied by a delegatable service ticket obtained from a trusted third party, the Kerberos key distribution center. The middle-tier server then uses the delegatable service ticket to obtain service tickets from the key distribution center. The obtained service tickets are used to impersonate the requesting principal to other servers in the network as needed to satisfy the original request.

The Kerberos approach to delegation, however, is intended primarily to handle synchronous connection to other servers and may not extend well to cases when the request is passed as an asynchronously transmitted message. A conventional approach for asynchronous message based authentication is to create a digital signature for the message. The digital signature is based on a public/private key pair. An example of such a digital signature approach to authentication is Public Key Infrastructure (PKI) authentication. PKI authentication is also conventionally used for synchronous connections, as in for example, Secure Socket Layer (SSL) and Transport Layer Security (TLS).

SUMMARY OF THE INVENTION

Embodiments of the present invention provide methods, systems, and computer program products for authenticating a message that is sent from an intermediate principal, such as a middle tier server, to a resource manager, where a client originates a request via a message to the intermediate principal using one authentication protocol, and where a different message is sent to the resource manager by the intermediate principal on the client's behalf, and where this second message is authenticated by a different authentication protocol. The message issued by the client containing the original request, i.e. a first message, may be referred to herein as the "C-message." The message issued by the intermediate principal on the client's behalf and carrying the delegated authority of the client, i.e. a second message, may be referred to as the "D-message." Note that each of the C-message or the D-message or both may constitute all or part of an asynchronous transmission, or may constitute all or part of a synchronous data connection. The D-message includes information from the client which has been authenticated by the intermediate principal using the first authentication protocol. In addition to this information, the D-message carries authentication information of the second authentication protocol, and is authenticated by the resource manager using that protocol.

In particular embodiments of the present invention, the first authentication protocol is Kerberos and the second authentication protocol is public key authentication s is enabled by a public key infrastructure (PKI). In such embodiments, authenticating the D-message may be provided by signing the D-message with a private key corresponding to a PKI certificate available to the resource manager. Furthermore, the D-message may be generated by receiving a Kerberos ticket, verifying authenticity of the Kerberos ticket and extracting principal information from the Kerberos ticket if the authenticity of the ticket is verified. The D-message is then generated utilizing the extracted principal information.

In further embodiments of the present invention, the D-message is generated utilizing the extracted principal information by incorporating the principal information with data from the message from the client to provide the D-message. In such embodiments, the resource manager receives the D-message and authenticates the signature of the D-message. The principal information is extracted from the D-message and the data of the D-message processed based on the principal information from the D-message if the signature of the D-message is authentic. Note that the resource manager determines whether or not the unit of work is authorized based on the identify of the client, not the identity of the middle-tier server or that of the public key signature service. The resource manager, typically, must recognize associated with the D-message signature as a trusted signature service, although the permissions granted tot he identity of the middle-tier server may be different from the permissions granted to the client identity by the resource manager.

In alternative embodiments of the present invention, the D-message is generated utilizing the extracted principal information by generating at least a first component and a second component of the D-message. The first component contains the principal information and the second component contains data from the message from the client. For example, the first component may contain the principal information that identifies the client and the second component contain the request data from the C-message. In such embodiments, the D-message is signed with a private key by signing the first component with the private key and signing the second component with the private key. Furthermore, the resource manager receives the D-message, authenticates the signatures of the first component and the second component, extracts the principal information from the first component and extracts the data, such as the request data from the C-message, from the second component. The request data of the second component is processed based on the principal information from the first component if the signatures of both components of the D-message are authentic.

In additional embodiments of the present invention, the Kerberos ticket and the request data from the C-message are sent from a middle-tier server to a public key signature service. In such embodiments, the public key signature service signs the message, so that it can be authenticated by the resource manager, and returns the signed D-message to the middle-tier server so that middle-tier server can forward it to the resource manager. Furthermore, data flows between the middle-tier server and the public key signature service may be authenticated, for example, using Data Encryption Standard (DES), SSL or other such mechanisms for encrypted data communications.

In still further embodiments of the present invention, the Kerberos service ticket is obtained by the middle-tier server responsive to receiving a delegatable Kerberos ticket. Also, an identification of the middle-tier server may be incorporated in the D-message as this information may be used to trace the delegation of authority from the client to the middle-tier server so as to associate the unit of work with the identities of both the client and the middle-tier server.

In still further embodiments of the present invention, a system for authentication of messages from a client utilizing Kerberos authentication and a resource manager utilizing public key infrastructure (PKI) authentication is provided by a public key signature service configured to receive a Kerberos service ticket, authenticate the Kerberos service ticket, generate a message incorporating data associated with the authenticated Kerberos service ticket which is signed using a digital signature based on a PKI private key and PKI certificate so as to allow the resource manager to authenticate the message and provide the signed message to the resource manager.

In additional embodiments of the present invention, the public key signature service is further configured to extract principal information from the Kerberos service ticket and incorporate the principal information with the message.

The system may also include a middle-tier server configured to obtain the Kerberos service ticket responsive to receipt of a delegatable Kerberos ticket and to provide the obtained Kerberos service ticket to the public key signature service. In such embodiments, the public key signature service may be further configured to provide the signed message to the resource manager by returning the signed message to the middle-tier server. The middle-tier server may be further configured to forward the signed message returned by the public key signature service to the resource manager.

In further embodiments of the present invention, the public key signature service is further configured to extract middle-tier server information from the Kerberos service ticket and incorporate the middle-tier server information with the message. The public key signature service may also be configured to selectively incorporate the principal information into the message with the data associated with the Kerberos service ticket and to selectively generate a second message associated with the message containing the data associated with the Kerberos ticket which contains the principal information and sign the message containing the data and the second message if the second message is generated.

As will further be appreciated by those of skill in the art, while described above primarily with reference to method aspects, the present invention may be embodied as methods, apparatus/systems and/or computer program products.

DETAILED DESCRIPTION OF THE INVENTION

Figure 1:
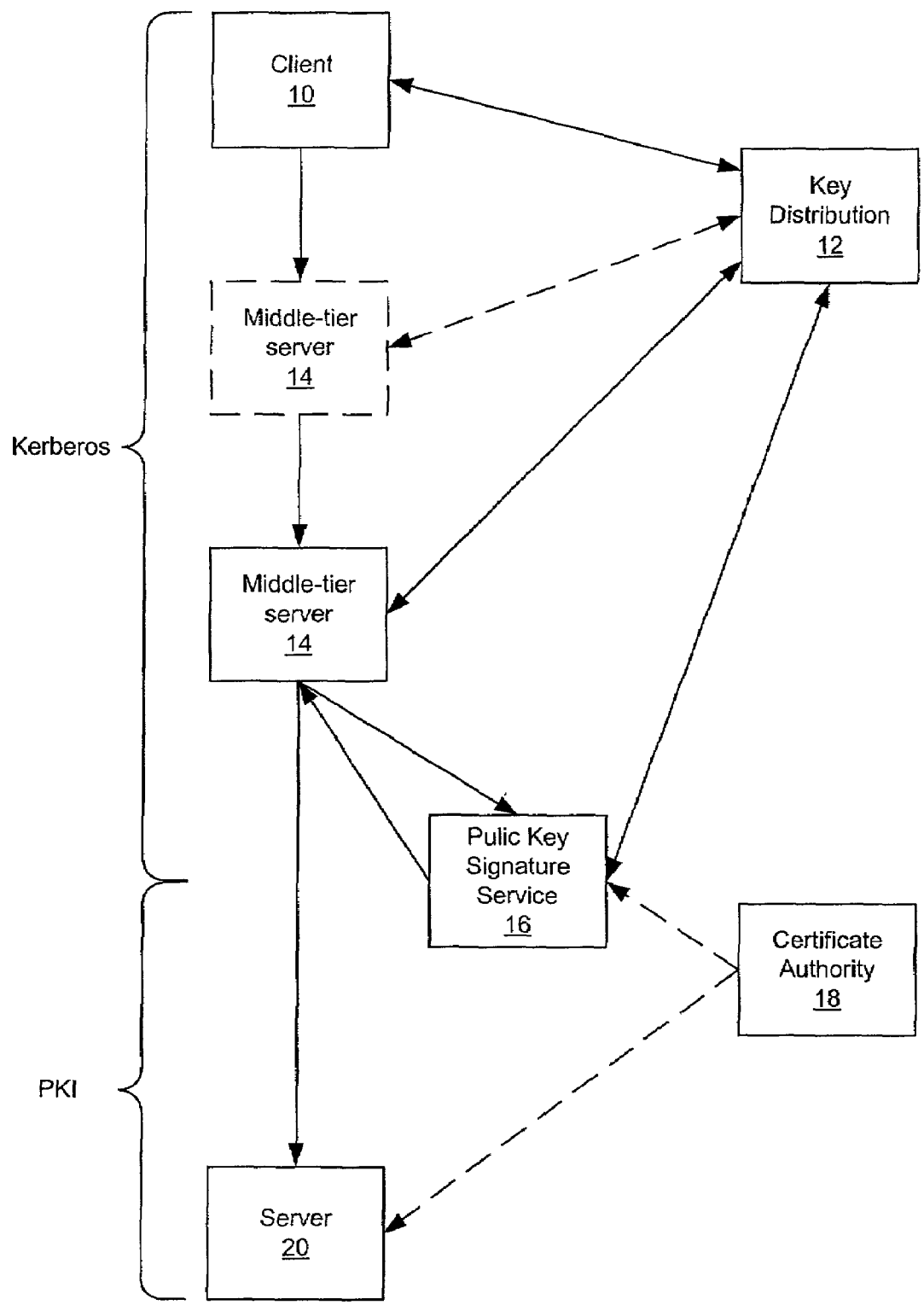
FIG. 1 is a block diagram illustrating a system incorporating embodiments of the present invention.

The present invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Various embodiments of the present invention will now be described with reference to the figures. As will be appreciated by those of skill in the art in light of the present disclosure, while embodiments of the present invention are described primarily with reference to Kerberos and PKI, embodiments of the present invention may also provide for authentication of messages across other differing authentication protocols. In embodiments of the present invention, the resource manager utilizes an authentication protocol based on a signature and a public key. However, the authentication protocols used by the client and the middle-tier server, or between the middle-tier server and the public key signature service may be authentication based on a user identification and password, challenge based authentication such as Cryptographic Handshake Authentication Protocol (CHAP) or Digest-MD5, or shared secret based authentication where the parties share a common cryptographic key.

FIG. 1 illustrates a network configuration having two different authentication protocols (e.g. Kerberos and PKI) in which embodiments of the present invention may be incorporated. As seen in FIG. 1, a principal may use a client data processing system 10 to request a unit of work from a resource manager, such as the resource server data processing system 20. Thus, the client 10 and the resource server 20 are endpoints for requesting and providing the work unit respectively. The servers between these endpoints may be referred to as "middle-tier servers." In the exemplary system illustrated in FIG. 1, the client 10 utilizes a first authentication protocol, such as Kerberos, and the resource server 20 utilizes a second authentication protocol which relies on PKI signatures. The client 10 communicates with a key distribution center 12 and one or more middle-tier servers 14. The middle-tier servers 14 are delegated authority by the client 10 to act on its behalf in requesting the unit of work from the resource server 20. Such delegation may be provided by the client 10 obtaining and providing a delegatable credential, such as a delegatable Kerberos ticket, to the middle-tier servers 14. The middle-tier servers 14 may also obtain delegatable credentials to be forward to the next data processing system in the sequence (tiers) used to reach the resource server 20.

As is further seen in FIG. 1, a public key signature service 16 may also be provided. As described in more detail below, the public key signature service 16 receives a delegatable credential from a middle-tier server 14, verifies the authenticity of the credential and creates a signed message which may be authenticated by the resource server 20 and which contains information about the principal utilizing the client 10 and/or a middle tier server 14 so that the resource server 20 may determine if a requested unit of work is authorized. In PKI embodiments of the present invention, the public key signature service 16 may be trusted by the resource server 20 based on the use of public and private keys and the distribution of certificates by a certificate authority 18. As is known to those of skill in the art, such public and private keys and certificates may be utilized to uniquely identify the signature of a third party so as to verify the authenticity of information signed by the third party.

While FIG. 1 is illustrated as having a single client 10 and a single resource server 20, multiple clients and/or servers may also be provided. Furthermore, the middle-tier server 14 is illustrated as communicating with a single resource server 20 but may communicate with one or more resource and/or middle-tier servers. Similarly, multiple key distribution centers, public key signature services and/or certificate authorities may also be provided. Thus, the present invention should not be construed as limited to the configuration of FIG. 1 but is intended to cover all configurations capable of carrying out the operations described herein.

Figure 2:
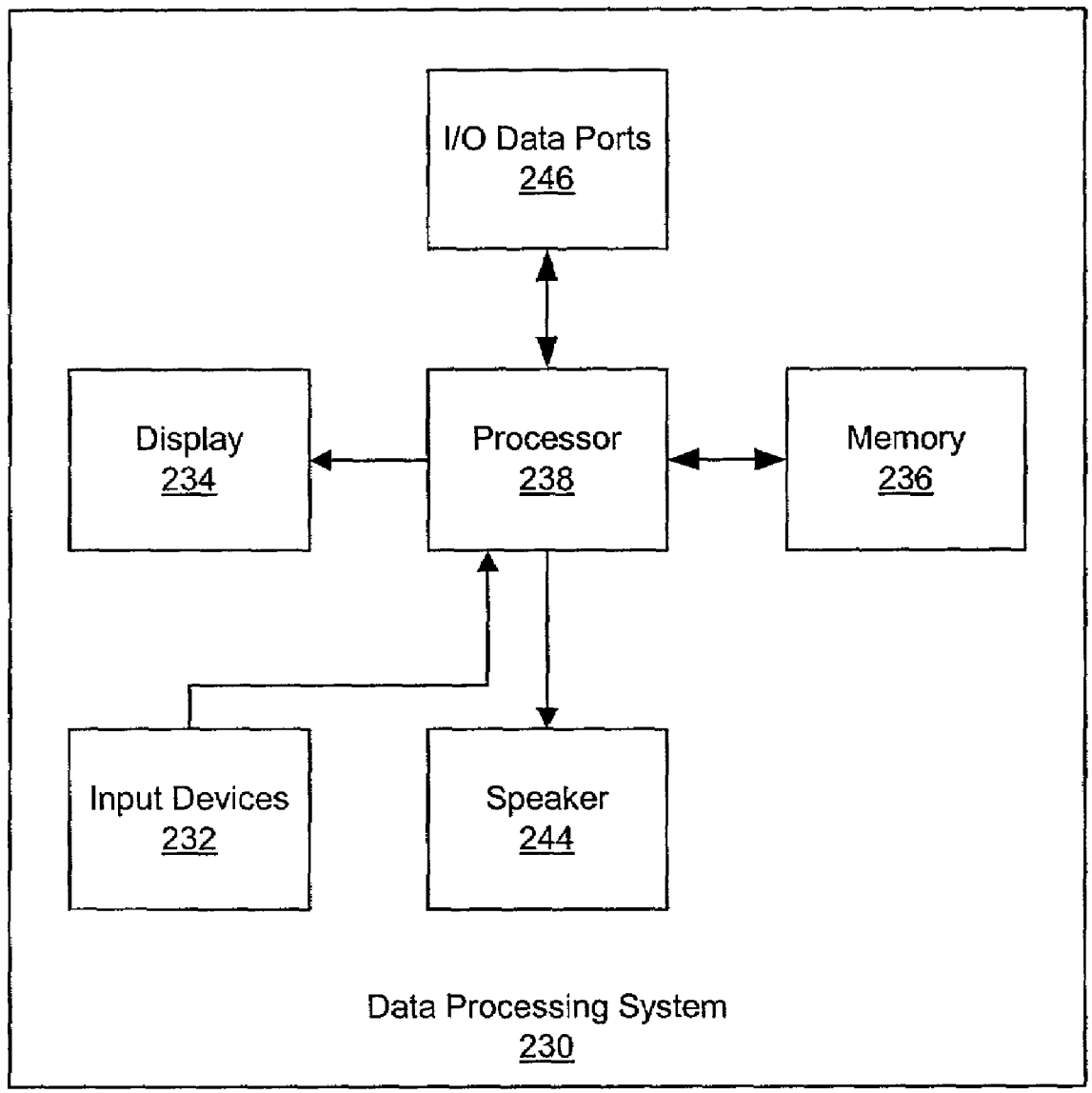
FIG. 2 is a block diagram of a data processing system suitable for use as a public key signature service, middle tier server, client and/or server according to embodiments of the present invention.

FIG. 2 illustrates an exemplary embodiment of a data processing system 230 suitable for providing a client, a middle tier server, a public key signature service and/or a resource server in accordance with embodiments of the present invention. The data processing system 230 typically includes input device(s) 232 such as a keyboard or keypad, a display 234, and a memory 236 that communicate with a processor 238. The data processing system 230 may further include a speaker 244, and an I/O data port(s) 246 that also communicate with the processor 238. The I/O data ports 246 can be used to transfer information between the data processing system 230 and another computer system or a network. These components may be conventional components such as those used in many conventional data processing systems which may be configured to operate as described herein.

Figure 3:
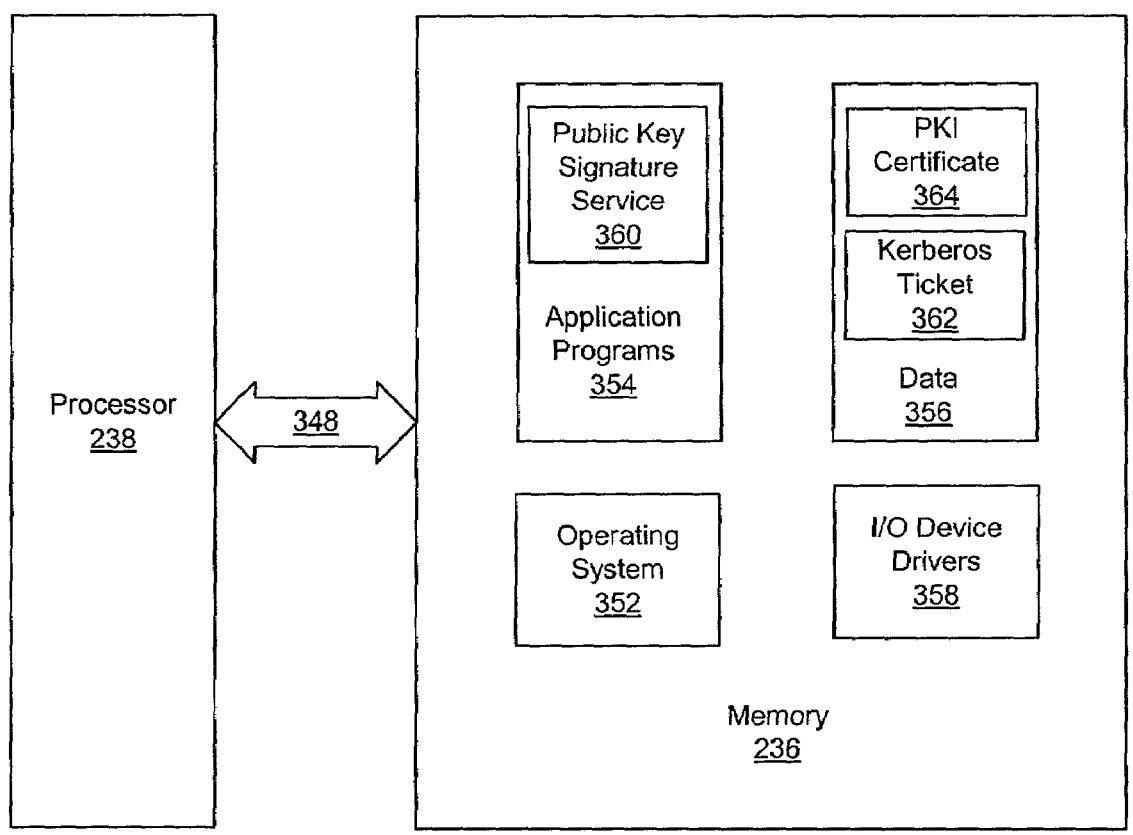
FIG. 3 is a more detailed block diagram of a public key signature service according to embodiments of the present invention.

FIG. 3 is a block diagram of embodiments of data processing systems that illustrates systems, methods, and computer program products in accordance with embodiments of the present invention. The processor 238 communicates with the memory 236 via an address/data bus 348. The processor 238 can be any commercially available or custom microprocessor. The memory 236 is representative of the overall hierarchy of memory devices containing the software and data used to implement the functionality of the data processing system 230. The memory 236 can include, but is not limited to, the following types of devices: cache, ROM, PROM, EPROM, EEPROM, flash memory, SRAM, and DRAM.

As shown in FIG. 3, the memory 236 may include several categories of software and data used in the data processing system 230: the operating system 352; the application programs 354; the input/output (I/O) device drivers 358; and the data 356. As will be appreciated by those of skill in the art, the operating system 352 may be any operating system suitable for use with a data processing such as OS/2, AIX or System390 from International Business Machines Corporation, Armonk, N.Y., Windows95, Windows98 or Windows2000 from Microsoft Corporation, Redmond, Wash., Unix or Linux configured to support an TCP/IP-based protocol connection. The I/O device drivers 358 typically include software routines accessed through the operating system 352 by the application programs 354 to communicate with devices such as the I/O data port(s) 246, the data storage 235 and certain memory 236 components. The application programs 354 are illustrative of the programs that implement the various features of the data processing system 230 and preferably include at least one application which supports operations according to embodiments of the present invention. Finally, the data 356 represents the static and dynamic data used by the application programs 354, the operating system 352, the I/O device drivers 358, and other software programs that may reside in the memory 236.

As is further seen in FIG. 3, the application programs 354 may include a public key signature service 360. The public key signature service 360 may carry out the operations described herein for authenticating messages received in one authentication protocol to provide authenticatable message in a second authentication protocol. The data portion 356 of memory 236, as shown in the embodiments of FIG. 3, may include a PKI certificate 364 and a Kerberos ticket 362 received along with a message. The PKI certificate 364 and the Kerberos ticket 362 may be utilized by the public key signature service 360 to authenticate the received message using the two authentication protocols.

While the present invention is illustrated, for example, with reference to the public key signature service 360 being an application program in FIG. 3, as will be appreciated by those of skill in the art, other configurations may also be utilized while still benefitting from the teachings of the present invention. For example, the public key signature service 360 may also be incorporated into the operating system 352, the I/O device drivers 358 or other such logical division of the data processing system 230. Thus, the present invention should not be construed as limited to the configuration of FIG. 3 but is intended to encompass any configuration capable of carrying out the operations described herein.

Operations according to embodiments of the present invention, including operations of the middle-tier server 14, the public key signature service 16 and the resource server 20, will now be described with reference to the exemplary network diagram of FIG. 1 and the flowcharts of FIGS. 4 through 6. However, as will be appreciated by those of skill in the art, the network illustrated in FIG. 1 is exemplary only. Embodiments of the present invention may be utilized in other network configurations.

Figure 4:
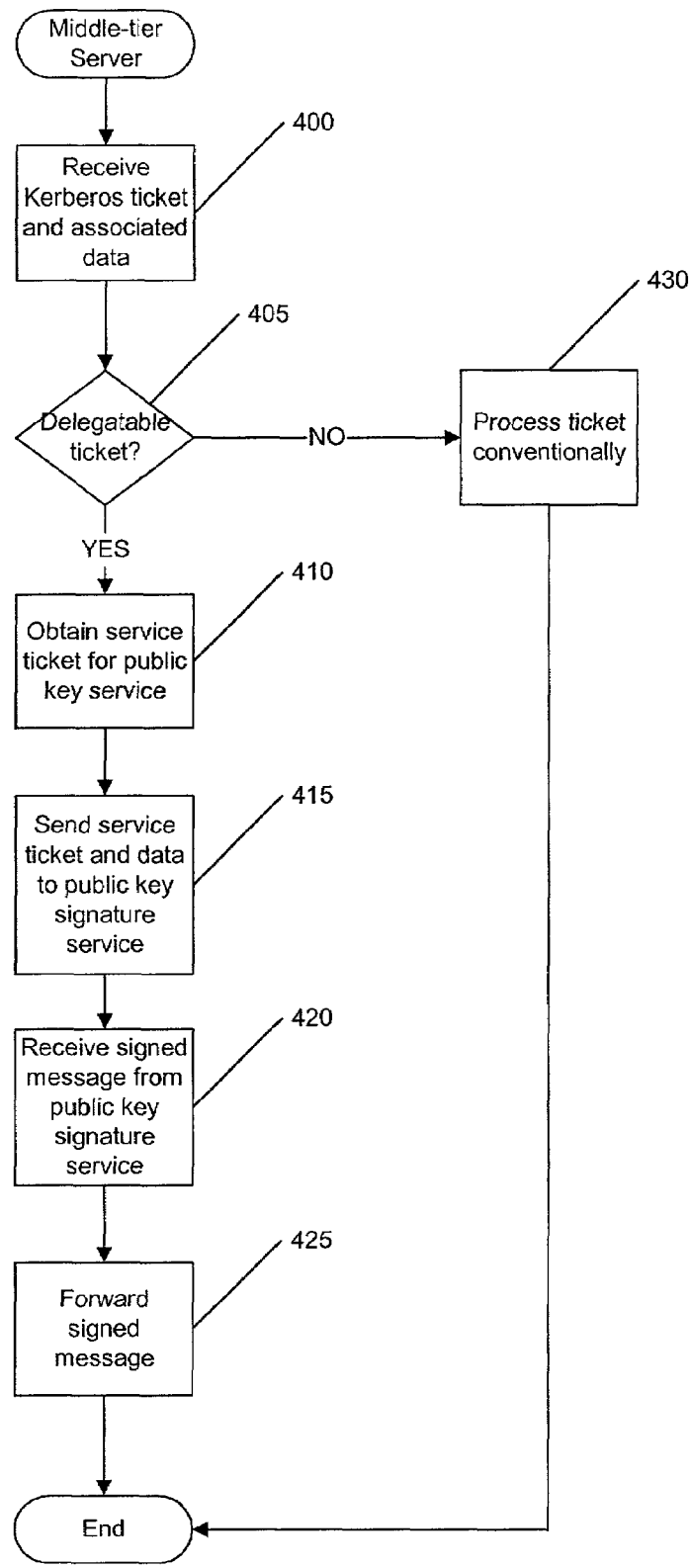
FIG. 4 is a flowchart illustrating operations of a middle-tier server according to embodiments of the present invention.

As seen in FIG. 4, a middle-tier server 14 according to embodiments of the present invention receives a Kerberos ticket (block 400) and determines if the ticket is delegatable (block 405). If not, the ticket is processed in a conventional manner (block 430). If, however, the ticket is delegatable (block 405), the middle-tier server 14 obtains a service ticket for the public key signature service 16 from the key distribution center 12 (block 410). The middle-tier server 14 sends the service ticket and the data to be sent to the resource server 20 to the public key signature service 16 (block 415) and receives back from the public key signature service 16 a signed message which includes the data sent and an indication of the principal which requested the unit of work (block 420). The signed message is forwarded to the resource server 20 (block 425) by the middle-tier server 14.

Figure 5A:
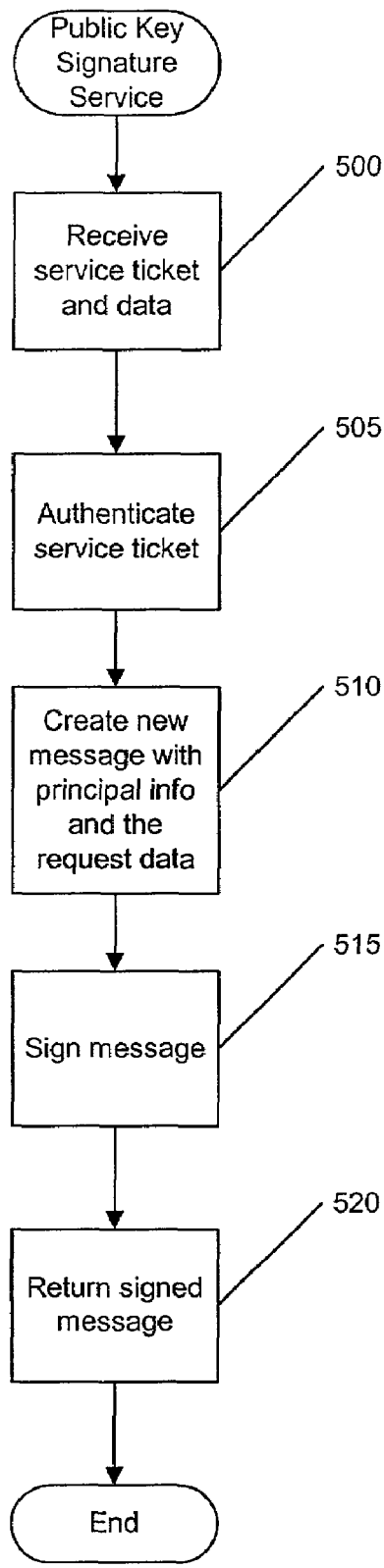
FIG. 5A is a flowchart illustrating operations of a public key signature service according to embodiments of the present invention.

FIG. 5A illustrates operations of a public key signature service 16 according to embodiments of the present invention. As seen in FIG. 5A, the public key signature service 16 receives the ticket and the associated data (block 500) and authenticates the service ticket utilizing the first authentication protocol which, in the present example, is Kerberos (block 505). The public key signature service 16 creates a new message incorporating the principal information from the service ticket with the data associated with the service ticket (block 510).

The new message may contain one or more messages or parts. For example, if the data associated with the service ticket is a Secure Socket Layer (SSL) challenge, then the information about the principal may not be incorporated directly with the original data but may be incorporated into a separate identity structure which is associated with the original data and is separately signed by the public key signature service 16. In such a case, both the data associated with the service ticket and the identity structure could be signed with the digital signature of the public key signature service 16.

The public key signature service 16 signs the new message with a digital signature utilizing the second authentication protocol (block 515). The signed message is returned to the middle-tier server from which the service ticket was received (block 520). Alternatively, the new message could be forwarded directly to the resource server 20.

Figure 5B:
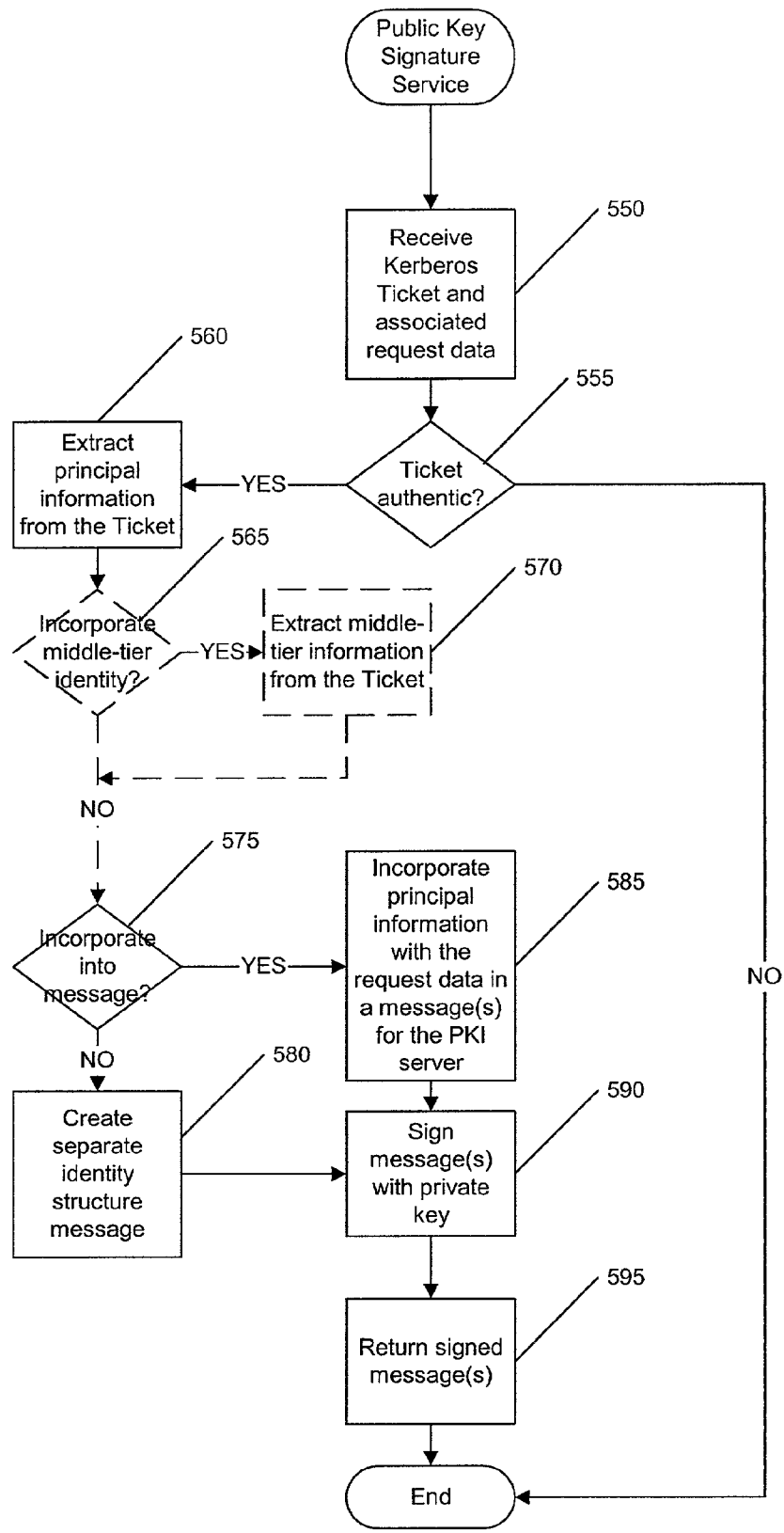
FIG. 5B is a more detailed flowchart of operations of FIG. 5A according to further embodiments of the present invention.

FIG. 5B illustrates further details regarding operations of the public key signature service 16 according to further embodiments of the present invention. As seen in FIG. 5B, the public key signature service 16 receives the Kerberos service ticket and the associated data (block 550) and authenticates the service ticket utilizing the Kerberos protocol (block 555). If the service ticket is not authentic (block 555), operations may cease. Alternatively, a log of tickets which fail authentication may be kept for further analysis.

If the service ticket is authentic (block 555), the principal information is extracted from the ticket (block 560). Optionally, the public key signature service 16 may also be determined if an identification of the middle-tier server 14 which provided the ticket is to be provided to the resource server 20 (block 565). If so, the middle-tier information is also extracted from the service ticket (block 570).

A determination is also made if the principal information and/or the middle-tier server information is to be incorporated with the data associated with the ticket (block 575). As described above, such a determination may be made based on the type of data associated with the ticket (e.g. the unit of work requested by the principal using the client 10). If additional data cannot be added to the data associated with the ticket, then a separate identity data structure which includes the principal and/or middle-tier server information may be created as a separate component of the message (block 580). The separate component may be a separate message. If additional data can be added to the data associated with the ticket (block 575), the principal and/or middle-tier server information and the data associated with the ticket may be incorporated into a message for the resource server 20 (block 585). In either case, the message and/or messages are signed with PKI private key of the public key signature service 16 utilizing conventional PKI signature techniques (block 590) and the signed message(s) returned to the middle-tier server 14 from which the service ticket was received (block 595). As described above, alternatively, the signed message(s) could be forwarded to the resource server 20 without being returned to the middle-tier server 14 from which the service ticket was received.

Figure 6:
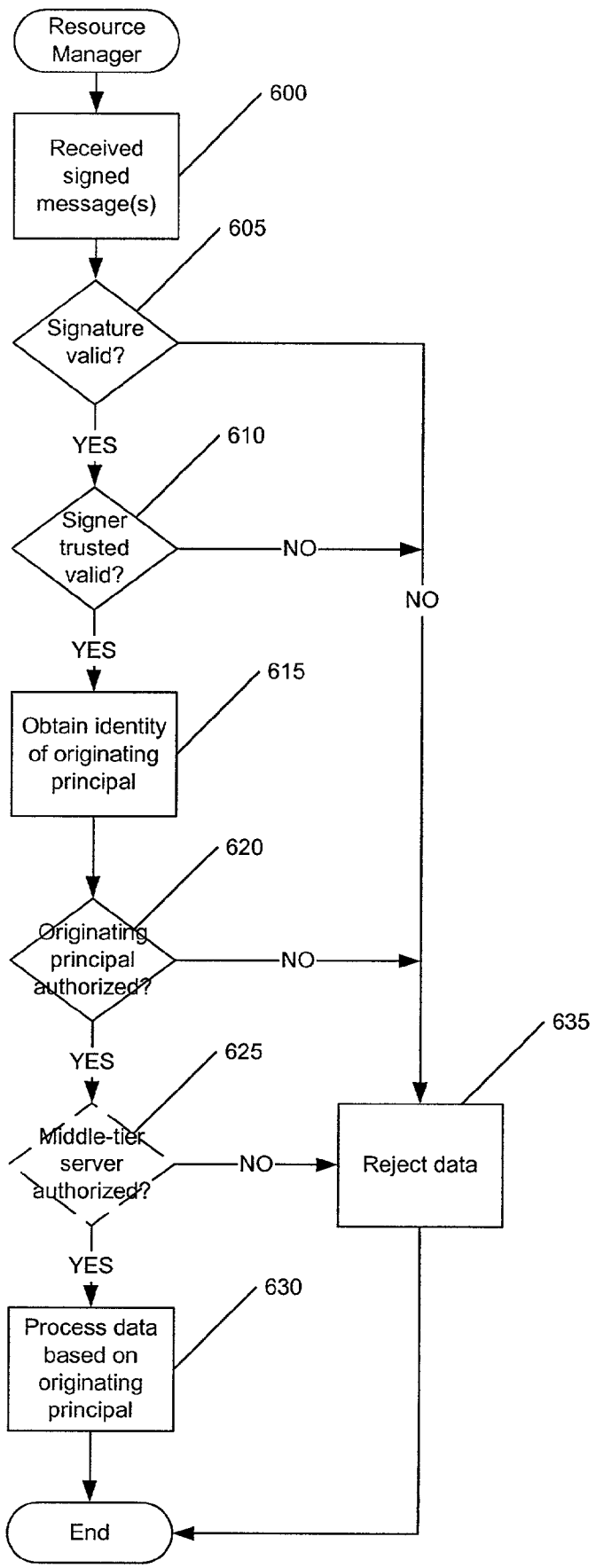
FIG. 6 is a flowchart illustrating operations of a resource manager according to embodiments of the present invention.

Operations of a resource server 20 according to exemplary embodiments of the present invention are illustrated in FIG. 6. As seen in FIG. 6, the resource server 20 receives the signed message or messages from the middle-tier server 14 or the public key signature service 16 (block 600) and determines if the signature is authentic utilizing the second authentication protocol (block 605). For example, the signature of the message(s) could be verified using conventional PKI techniques.

If the signature is not authentic (block 605), the data of the message(s) may be rejected (block 635). If the signature is authentic (block 605), it may also be determined if the signer of the message(s) was a trusted party (block 610). If not, the data is rejected (block 635). If the signer is a trusted party (block 610), the identity of the requesting principal is obtained from the message(s) (block 615). It is determined if the requesting principal has the authority to request the unit of work specified by the data (block 620) and, if not, the data is rejected (block 635). If the requesting principal has the authority to request the unit of work (block 620), it may optionally be determined if the middle-tier server 14 is authorized to access the resource server 20 (block 625) and, if not, the data is rejected (block 635). If the middle-tier server 14 is authorized to access the resource server 20 (block 625), the data is processed as if sent by the requesting principal (block 630). Optionally, if the data is rejected or if the data is processed, an audit log may be updated to indicate the action taken. Such an audit log may record information about the requesting principal.

In addition to the operations described above, optionally, communications with the public key signature service 16 may be encrypted. Furthermore, while the present invention has been described, in part, with reference to the resource server 20, as will be appreciated by those of skill in the art in light of the present disclosure, the resource server 20 is illustrative of resource managers in general. Accordingly, embodiments of the present invention may be utilized to securely access resource managers of differing types. The resource managers may include, for example, security policies for carrying out some or all of the operations described above for authentication of requests to access a resource managed by the resource manager.

The flowcharts and block diagrams of FIGS. 1 through 6 illustrate the architecture, functionality, and operation of possible implementations of systems, methods and computer program products for message authentication according to various embodiments of the present invention. In this regard, each block in the flow charts or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be understood that each block of the block diagrams and/or flowchart illustrations, and combinations of blocks in the block diagrams and/or flowchart illustrations, can be implemented by special purpose hardware-based systems which perform the specified functions or acts, or combinations of special purpose hardware and computer instructions.

Furthermore, in the drawings, certain operations/acts and or blocks which have been indicated as optional are shown in dashed lines. The presence or lack of such a dashed line shall not, however, be construed as requiring any of the elements of the figures other than those necessary to provide the functions, operations and/or acts specified in the claims set forth below.

In the drawings and specification, there have been disclosed typical illustrative embodiments of the invention and, although specific terms are employed, they are used in a generic and descriptive sense only and not for purposes of limitation, the scope of the invention being set forth in the following claims.

That which is claimed is:

1. A method of authenticating a message from a client using a first authentication protocol to a resource manager using a second authentication protocol different from the first authentication protocol, the method comprising:
   generating a second message from the message from the client, the second message including information from the client which has been authenticated using the first authentication protocol;
   authenticating the second message using the second authentication protocol; and
   providing the authenticated second message to the resource manager wherein the first authentication protocol comprises Kerberos and the second authentication protocol comprises public key infrastructure (PKI).

2. The method of claim 1, wherein the step of authenticating the second message comprises signing the second message with a private key corresponding to a PKI certificate available to the resource manager so as to provide the second message with a signature.

3. The method of claim 2, wherein the step of generating a second message comprises:
   receiving a Kerberos ticket;
   verifying authenticity of the Kerberos ticket;
   extracting principal information from the Kerberos ticket if the authenticity of the ticket is verified; and
   generating the second message utilizing the extracted principal information.

4. The method of claim 3, wherein the step of generating the second message utilizing the extracted principal information comprises incorporating the principal information with data from the message from the client to provide the second message.

5. The method of claim 4, wherein the resource manager carries out the steps of:
   receiving the second message;
   authenticating the signature of the second message;
   extracting the principal information from the second message; and processing the data from the second message based on the principal information from the second message if the signature of the second message is authentic.

6. The method of claim 3, wherein the step of generating the second message utilizing the extracted principal information comprises generating at least a first component and a second component of the second message, the first component containing the principal information and the second component containing data from the message from the client.

7. The method of claim 6, wherein the step of signing the second message with a private key comprises signing the first component with the private key and signing the second component with the private key.

8. The method of claim 7, wherein the resource manager carries out the steps of:

receiving the at least two second messages,
authenticating the signatures of the second message;
extracting the principal information from the first component;
extracting the data from the second component; and
processing the data of the second component based on the principal information from the first component if the signatures of the at least two second messages are authentic.

9. The method of claim 3, wherein the step of receiving a Kerberos ticket comprises receiving a Kerberos service ticket from a middle-tier server.

10. The method of claim 9, wherein the step of providing the authenticated second message to the resource manager comprises returning the authenticated second message to the middle-tier server.

11. The method of claim 10, wherein the Kerberos service ticket and the authenticated second message are encrypted.

12. The method of claim 9, wherein the Kerberos service ticket is obtained by the middle-tier server responsive to receiving a delegatable Kerberos ticket.

13. The method of claim 9 further comprising incorporating an identification of the middle-tier server in the second message.

14. A method of providing authentication for communications between a Kerberos client and a public key infrastructure (PKI) server, the method comprising:
    authenticating a message from the Kerberos client at a party trusted by the PKI server;
    signing the authenticated message with the PKI private key of the party trusted by the PKI server;
    forwarding the signed authenticated message to the PKI server; and
    incorporating an identification of a principal of the message from the Kerberos client with the signed authenticated message, wherein the step of incorporating an identification of the principal of the message comprises incorporating the identification of the principal into a second message signed with the private key, and wherein forwarding the signed authenticated message comprises forwarding the signed authenticated message and the second message to the PKI server.

15. A method of providing authentication for communications between a Kerberos client and a public key infrastructure (PKI) server, the method comprising:
    authenticating a message from the Kerberos client at a party trusted by the PKI server;
    signing the authenticated message with the PKI private key of the party trusted by the PKI server; and
    forwarding the signed authenticated message to the PKI servers, wherein the step of authenticating the message is performed responsive to receiving a Kerberos service ticket.

16. The method of claim 15, further comprising incorporating an identification of a source of the Kerberos service ticket with the signed authenticated message.

17. A system for authentication of messages from a client utilizing Kerberos authentication and a resource manager utilizing public key infrastructure (PKI) authentication, comprising:
    a data processor apparatus implementing a public key signature service configured to receive a Kerberos service ticket,
    authenticate the Kerberos service ticket,
    generate a message incorporating data associated with the authenticated Kerberos service ticket which is signed using a digital signature based on a PKI private key and PKI certificate so as to allow the resource manager to authenticate the message and provide the signed message to the resource manager.

18. The system of claim 17, wherein the public key signature service is further configured to extract principal information from the Kerberos service ticket and incorporate the principal information with the message.

19. The system of claim 17, further comprising a middle-tier server configured to obtain the Kerberos service ticket responsive to receipt of a delegatable Kerberos ticket and to provide the obtained Kerberos service ticket to the public key signature service.

20. The system of claim 19, wherein the public key signature service is further configured to provide the signed message to the resource manager by returning the signed message to the middle-tier server and wherein the middle-tier server is further configured to forward the signed message returned by the public key signature service to the resource manager.

21. The system of claim 20, wherein the public key signature service is further configured to extract middle-tier server information from the Kerberos service ticket and incorporate the middle-tier server information with the message.

22. The system of claim 18, wherein the public key signature service is further configured to selectively incorporate the principal information into the message with the data associated with the Kerberos service ticket and to selectively generate a second message associated with the message containing the data associated with the Kerberos ticket which contains the principal information and sign the message containing the data and the second message if the second message is generated.

23. A system for authenticating a message from a client using a first authentication protocol and a resource manager using a second authentication protocol different from the first authentication protocol, comprising:
    means for generating a second message from the message from the client, the second message including information from the client which has been authenticated using the first authentication protocol;
    means for authenticating the second message using the second authentication protocol; and
    means for providing the authenticated second message to the resource manager wherein the first authentication protocol comprises Kerberos and the second authentication protocol comprises public key infrastructure (PKI).

24. A computer program product for authenticating a message from a client using a first authentication protocol and a resource manager using a second authentication protocol different from the first authentication protocol, comprising:
    a computer readable storage media having computer readable program code embodied therein, the computer readable program code comprising:
    computer readable program code which causes a computer to generate a second message from the message from the client, the second message including information from the client which has been authenticated using the first authentication protocol;
    computer readable program code which causes the computer to authenticate the second message using the second authentication protocol; and
    computer readable program code which causes the computer to provide the authenticated second message to the resource manager wherein the first authentication protocol comprises Kerberos and the second authentication protocol comprises public key infrastructure (PKI).

* * * * *